United States Patent [19]  [11] 4,408,258
Dapo  [45] Oct. 4, 1983

[54] ALUMINUM ELECTRODE CAPACITOR AND GLYCOL FILL ELECTROLYTE THEREFOR

[75] Inventor: Roland F. Dapo, Columbia, S.C.

[73] Assignee: North American Philips Corporation, New York, N.Y.

[21] Appl. No.: 325,515

[22] Filed: Nov. 27, 1981

Related U.S. Application Data

[63] Continuation-in-part of Ser. No. 190,147, Sep. 24, 1980, abandoned, which is a continuation of Ser. No. 61,120, Jul. 27, 1979, abandoned.

[51] Int. Cl.³ .............................................. H01G 9/02
[52] U.S. Cl. .................................... 361/433; 252/62.2
[58] Field of Search ....................... 252/62.2; 361/433

[56] References Cited

U.S. PATENT DOCUMENTS

| 2,965,690 | 12/1960 | Petersen et al. | 252/62.2 X |
| 3,403,305 | 9/1968 | Santway et al. | 252/62.2 X |
| 3,696,037 | 10/1972 | Lagercrantz et al. | 252/62.2 |
| 4,117,531 | 9/1978 | Ross et al. | 252/62.2 X |
| 4,242,722 | 12/1980 | Ross et al. | 252/62.2 X |

FOREIGN PATENT DOCUMENTS

| 2049098 | 4/1972 | Fed. Rep. of Germany | 252/62.2 |
| 2209095 | 9/1972 | Fed. Rep. of Germany | 252/62.2 |

Primary Examiner—Jack Cooper
Attorney, Agent, or Firm—Norman N. Spain

[57] ABSTRACT

Non-toxic aluminum electrode capacitors are provided in which the electrolyte is a solution in ethylene glycol of a neutralization product of about 1 mol of isophthalic acid or terephthalic acid and about 2 mols of a dialkylamine or piperidine.

5 Claims, No Drawings

ALUMINUM ELECTRODE CAPACITOR AND GLYCOL FILL ELECTROLYTE THEREFOR

BACKGROUND OF THE INVENTION

This application is a continuation-in-part of application Ser. No. 190,147, filed Sept. 24, 1980 now abandoned, said application Ser. No. 190,147 being a continuation of application Ser. No. 61,120 filed July 27, 1979 and now abandoned.

The present invention relates to electrolytic capacitors and to an improved electrolyte therefor.

Presently there is much demand for aluminum electrode capacitors which meet the requirement of having a low and stable equivalent series resistance (ESR), which operate at high operating temperatures and which are safe for the user. It has been found that while one or two of these requirements can be met, no electrolyte now on the market is able to meet all these requirements.

Thus, in order to meet the requirement for low ESR, an electrolyte based on dimethylformamide (DMF) is frequently chosen. However, DMF is a toxic material and thus is considered to be unsafe by many users.

While ethylene glycol (EG) based fill electrolytes are also widely used in the industry and are considered safe, these electrolytes have a resistivity which is higher than desired for capacitors of low ESR design.

Further such low resistivity glycol fill electrolytes as those containing adipic acid and ammonium hydroxide or such dicarboxylic aliphatic organic acids as adipic and succinic acids and alkanolamines, as disclosed in Jenny et al, U.S. Pat. 3,547,423, while being less toxic than the DMF containing electrolyte and allowing the productions of low ESR aluminum capacitors, suffer from the fact that the capacitance of capacitors containing these electrolytes decreases to an undesirable extent during the operating life.

Further in Anderson, U.S. Pat. No. 4,024,442, there is disclosed an electrolyte for use in aluminum electrolytic capacitors that meets the requirement of safety. This electrolyte comprises an ethylene glycol solution of benzoic acid or toluic acid and a tertiary aliphatic amine such as triethylamine or trimethylamine for at least partially neutralizing the acid. While this electrolyte is safe for the user and capacitors containing the same have relatively good temperature stability it is found that the electrolyte containing the benzoic or toluic acids has a tendency to dissolve the aluminum oxide of the capacitor and further the ionogens employed in this electrolyte (the neutralized salts of the benzoic or toluic acids) have resistivities which is undesirable for many applications.

BRIEF SUMMARY OF THE INVENTION

It is therefore an object of this invention to provide an electrolyte for electrolytic capacitors that will meet the requirements of being safe for the user, have a low and stable ESR and be stable at high operating temperatures. It is an additional object of this invention to provide an electrolyte for electrolytic capacitors that allows for the design of a low ESR capacitor having an improved shelf life and an improved capacity retention during its operating life.

It is further an object of this invention to provide an electrolyte for an aluminum electrolyte capacitor containing an ionogen that is safe for the user and also has a relatively low resistivity.

It is additionally an object of this invention to provide an aluminum electrolytic capacitor that contains a safe electrolyte, has a high degree of capacitence retention, low and stable ESR and can tolerate high operating temperature for an extended period of time.

These and other objects of the invention will be apparent from the description that follows.

According to the invention these objects are achieved by providing a new and novel electrolyte composition particularly for use in aluminum electrolytic capacitors.

The electrolyte of the instant invention consists essentially of a solution of ethylene glycol of the neutralization product of an ionogen consisting of an aromatic dicarboxylic acid and an organic amine of the group consisting of dimethylamine, diethylamine and piperidine. The acid employed is a dicarboxylic aromatic acid of the formulae

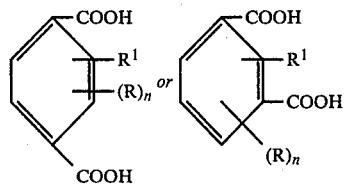

where in each case R is alkyl of 1–6 carbon atoms, alkoxy of 1–6 carbon atoms, alkenyl of up to 6 carbon atoms, benzoyl, phenyl, nitro or phenoxy, $R^1$ is hydrogen or alkyl of up to 6 carbon atoms and n is an integer of 0–3.

Some examples of the dicarboxylic aromatic acids that may be employed are isophthalic acid, terephthalic acid, 5-methyl-1,4-benzenedicarboxylic acid and 5-nitro-1,4-benzenedicarboxylic acid.

A sufficient amount of the amine is employed to fully neutralize the acid. Preferably the mole ratio of the amine to the acid is about 2:1.

The amount of the solvent that should be employed ranges from about 50 to 95% by weight with the optimum range being about 70–80% by weight.

Cosolvents such as tetrahydrofurfuryl alcohol, butyrolactone or glycol ethyl ether may be employed in amounts of up to 20% by weight in order to prevent crystallization of the electrolyte, i.e. at temperatures lower than $-20°$ C.

The novel electrolyte composition of the invention may be employed in any of the known types of liquid electrolyte capacitors such as the wound cartridge type, the sintered slug type and the wound impregnated cartridge type.

Water up to 10% by weight may be present in order to decrease resistivity. However since the ionogens employed in the invention have the unusual property of forming hydrates with a small amount of water it is preferred that the amount of water present be not greater than up to about 5% by weight in order to prevent an increase in vapor pressure.

The anode and cathode may be formed of such known value metals as aluminum, titanium, niobium and tantalum. Aluminum is preferred for the wound impregnated cartridge type.

The novel electrolyte of the invention is preferably employed in an aluminum impregnated cartridge type capacitor of conventional design. In such a capacitor an aluminum foil anode and an aluminum foil cathode, at least one of which has an oxide film thereupon and separated by a paper spacer are wound into a cylindrical shape, impregnated with the electrolyte and sealed in a container of suitable design.

DESCRIPTION OF THE PREFERRED EMBODIMENTS

The invention will now be described in greater detail with reference to the following examples and tables.

Four variations of electrolyte compositions of the invention were prepared by mixing in descending order the ingredients shown in weight percent in the following Table I. These ingredients being dimethylamine (DMA), isophthalic acid (IPA), terephthalic acid (TPA), ethylene glycol (EG), tetrahydrofurfuryl alcohol (THFA) and water (HOH). All the formulations but formulation III were heated to 130° C. before use. The resistivity at 30° C., the pH and the breakdown voltage on aluminum foil are also shown in the following Table I. The stability of the resistivity of these formulations was determined by exposing them to a temperature of 125° C. for 500 hours. The maximum increase in resistivity at 30° C., was found to be 16%.

TABLE I

| Formulation Number | I | II | III | IV |
|---|---|---|---|---|
| EG | 85.50% | 75.50% | 53.50% | 75.50% |
| THFA | 0.00 | 10.00 | 12.00 | 10.00 |
| HOH | 0.00 | 0.00 | 4.50 | 0.00 |
| IPA | 9.50 | 9.50 | 19.50 | 0.00 |
| TPA | 0.00 | 0.00 | 0.00 | 9.50 |
| DMA | 5.00 | 5.00 | 10.50 | 5.00 |
| Resistivity at 30° C., ohm-cm | 294 | 285 | 186 | 285 |
| pH | 6.25 | 6.68 | 7.68 | 8.87 |
| Breakdown Voltage | 140 | 130 | 95 | 128 |

In order to evaluate the properties of aluminum electrolytic capacitors when impregnated with the electrolytes of the invention aluminum foil capacitors were impregnated with the composition of formulations II and III and compared to aluminum foil capacitors impregnated with two known electrolytes, control A, a 15% solution of an amine salt of adipic acid in ethylene glycol and control B, a solution of 5% ammonium hydroxide and 10% adipic acid in ethylene glycol. The results are given in the four tables below.

TABLE II

RV 7.5
CaP 300 MF

| SHELF RESULTS (Ave's) | 500 Hr at 85° C. | | | |
|---|---|---|---|---|
| | Initial $I_L$ (5) | Final $I_L$ (5) | S.F. | No. Units Tested |
| Formulation II | 1.820 | 4.985 | 1.60 | 10 |
| Control A | 1.949 | 5.570 | 1.85 | 10 |

| OPERATING LIFE (Ave's) | at 85° C. | |
|---|---|---|
| | No. Tested | |
| | 6 | 6 |
| | Electrolyte Control A | Formulation II |
| Cap | 330 MF | 349 MF |
| Amps | 11.6 | 13.3 |
| Initial ESR | 7.5 mohm | 5.69 mohm |

| | $I_L$ (5) | Cap Ret % | ESR % | $I_L$ (5) | Cap Ret % | ESR % |
|---|---|---|---|---|---|---|
| Initial | 1.23 | 100.0 | 100.0 | 0.85 | 100.0 | 100.0 |
| 500 Hr. | 0.37 | 92.9 | 125.2 | 0.51 | 94.9 | 108.4 |

TABLE II-continued

RV 7.5
CaP 300 MF

| 1000 Hr. | 0.78 | 84.6 | 140.1 | 0.86 | 93.3 | 108.4 |
|---|---|---|---|---|---|---| one low Cap failure at 500 Hr.  
4 low Cap failures at 1000 Hr.  
one low Cap failure at 500 Hr.  
one low Cap failure at 1000 Hr.

In this and the following tables RV=rated voltage, Cap (first occurrence)=rated capacitance, in MF, millifarads, $I_L$=5 minute leakage current in milliamps at 25° C., S.F.=initial build time/final build time, where the build time is the time required to reach its rated voltage at a constant current. Cap (subsequent occurrence)=measured capacitance of capacitor employed, Cap Ret=% of retention of initial capacitance, ESR-%=equivalent series resistance in % change from initial.

TABLE III

RV 75
Cap 29 MF

| SHELF LIFE (Ave's) | 250 Hr at 85° C. | | | |
|---|---|---|---|---|
| | Initial $I_L$ (5) | Final $I_L$ (5) | S.F. | No. Units Tested |
| Formulation II | 0.455 | 1.012 | 1.04 | 8 |
| Control A | 0.432 | 0.888 | 1.04 | 7 |

| OPERATING LIFE (Ave's) | at 85° C. | |
|---|---|---|
| | No. Tested | |
| | 6 | 8 |
| | Electrolyte Control A | Formulation II |
| Cap | 32.2 MF | 32.2 MF |
| Amps | 14.8 | 17.3 |
| Initial ESR | 11.7 mohm | 8.9 mohm |

| | $I_L$ (5) | Cap Ret % | ESR % | $I_L$ (5) | Cap Ret % | ESR % |
|---|---|---|---|---|---|---|
| Initial | 0.60 | 100.0 | 100.0 | .73 | 100.0 | 100.0 |
| 500 Hr. | 0.34 | 98.6 | 121.9 | .28 | 100.4 | 108.9 |
| 1000 Hr. | 0.33 | 97.4 | 122.2 | .29 | 99.7 | 107.8 |
| 1500 Hr. | 0.21 | 96.9 | 123.4 | .28 | 99.2 | 112.3 |
| 2000 Hr. | 0.13 | 96.3 | 127.0 | .12 | 99.1 | 113.9 | two failures during test  No failures

TABLE IV

RV 10
Cap 240 MF

| SHELF LIFE (Ave's) | 250 Hr at 85° C. | | | |
|---|---|---|---|---|
| | Initial $I_L$ (5) | Final $I_L$ (5) | S.F. | No. Units Tested |
| Formulation II | 0.520 | 0.857 | 1.09 | 10 |
| Control A | 0.443 | 0.688 | 1.15 | 10 |

| OPERATING LIFE (Ave's) | at 85° C. | |
|---|---|---|
| | No. Tested | |
| | 8 | 10 |
| | Electrolyte Control A | Formulation II |
| Cap | 235 MF | 249 MF |
| Amps | 22.3 | 25.6 |
| Initial ESR | 5.53 mohm | 4.17 mohm |

| | $I_L$ (5) | Cap Ret % | ESR % | $I_L$ (5) | Cap Ret % | ESR % |
|---|---|---|---|---|---|---|
| Initial | 0.62 | 100.0 | 100.0 | 0.95 | 100.0 | 100.0 |
| 500 Hr. | 0.43 | 99.7 | 107.5 | 0.32 | 99.3 | 102.8 |
| 1000 Hr. | 0.54 | 98.4 | 108.5 | 0.41 | 98.5 | 99.3 |
| 1500 Hr. | 0.34 | 98.3 | 114.2 | 0.33 | 98.9 | 107.7 |
| 2000 Hr. | 0.23 | 97.2 | 114.0 | 0.23 | 98.7 | 101.0 |

No failures  
One failure in 10 units High ESR Chg & Low Cap. (Not used in above

TABLE IV-continued

RV 10
Cap 240 MF ave's) Appears due to tab/rivet connection

TABLE V

RV 20
Cap 250 MF

| SHELF LIFE (Ave's) | | 100 Hr at 85° C. | | |
|---|---|---|---|---|
| | Initial $I_L$ (5) | Final $I_L$ (5) | S.F. | No. Units |
| Formulation III | 3.25 | 3.65 | 1.05 | 7 |
| Control A | 2.12 | 5.14 | 1.18 | 7 |

OPERATING LIFE (Ave's) at 85° C.

| | No. Tested | |
|---|---|---|
| | 6 | 6 |
| Electrolyte | Control B | Formulation III |
| Cap | 283,100 µF | 282,100 µF |
| Amps | 15.5 | 15.5 |
| Initial ESR | 5.08 mohm | 4.79 mohm |

| | $I_L$ (5) | Cap Ret % | ESR % | $I_L$ (5) | Cap Ret % | ESR % |
|---|---|---|---|---|---|---|
| Initial | 3.07 | 100.0 | 100.0 | 2.40 | 100.0 | 100.0 |
| 500 Hr. | 1.56 | 92.4 | 107.8 | 1.02 | 99.7 | 99.8 |
| 1000 Hr. | 1.24 | 92.8 | 118.4 | 0.94 | 99.6 | 104.4 |
| 1500 Hr. | 1.13 | 90.2 | 121.6 | 0.88 | 97.2 | 103.8 |

(1) 2 vented at 500 Hrs. and removed from test.  No failures
(2) 4 passed all requirements at 1500 Hrs.

In the following Table VI additional examples of the electrolyte compositions of the invention are disclosed along with the resistivity at 30° C., pH and the breakdown voltage at 105° C. In this table along with the previously employed abbreviations BLO is also employed for butyrolactone.

TABLE VI

| Trial | A | B | C | D | E | F |
|---|---|---|---|---|---|---|
| Chemical; wt % | | | | | | |
| EG | 65.5 | 65.5 | 65.5 | 48.0 | 45.5 | 45.5 |
| THFA | 10.0 | 20.0 | 0.0 | 12.0 | 20.0 | 0.0 |
| BLO | 0.0 | 0.0 | 20.0 | 0.0 | 0.0 | 20.0 |
| HOH | 10.0 | 0.0 | 0.0 | 10.0 | 4.5 | 4.5 |
| IPA | 9.5 | 9.5 | 9.5 | 19.5 | 19.5 | 19.5 |
| DMA | 5.0 | 5.0 | 5.0 | 10.5 | 10.5 | 10.5 |
| Heated to °C. | 95 | 130 | 130 | 95 | 95 | 95 |
| Properties | | | | | | |
| Resistivity at 30° C., ohm-cm | 184 | 290 | 282 | 171 | 224 | 187 |
| pH | 7.50 | 7.57 | 6.71 | 8.67 | 8.77 | 7.58 |

TABLE VI-continued

| Trial | A | B | C | D | E | F |
|---|---|---|---|---|---|---|
| Breakdown voltage, 105° C. | 130 | 141 | 157 | 100 | 100 | 110 |

As shown by the foregoing examples and Tables the novel electrolyte of the invention not only combines the desired property of being highly safe but also provides capacitors of low ESR design, capacitors that have a high degree of capacitance retention throughout their operating life and capacitors which can tolerate high operating temperatures for long periods of time.

While the present invention has been described with references to particular embodiments thereof, it will be understood that numerous modifications can be made by those skilled in the art without actually departing from the scope of the invention.

What I claim is:

1. An electrolytic capacitor comprising aluminum anode and cathode members separated by an insulating spacer impregnated with an electrolyte consisting essentially of a solution in ethylene glycol of the neutralization product of about 2 mols of dimethylamine, diethylamine or piperidine and about 1 mol of dicarboxylic aromatic acid of the formulae

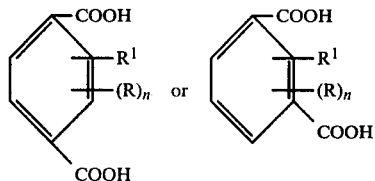

where in each case R is alkyl of 1–6 carbon atoms, alkoxy of 1–6 carbon atoms, alkenyl of up to 6 carbon atoms, benzoyl, phenyl, nitro or phenoxy, $R^1$ is hydrogen or alkyl of up to 6 carbon atoms and n is an integer of 0–3.

2. The electrolytic capacitor of claim 1 wherein the dicarboxylic acid is isophthalic acid or terephthalic acid.

3. THe electrolytic capacitor of claim 2 wherein the solvent employed in the electrolyte comprises 50–95% by weight of the electrolyte.

4. The electrolytic capacitor of claim 2 wherein any water present in the electrolyte is present in an amount not greater than 10% by weight.

5. The electrolytic capacitor of claim 4 wherein the electrolyte contains a cosolvent selected from the group consisting of tetrahydrofurfuryl alcohol, glycol ethyl ether and butyrolactone in an amount up to 20% by weight of the electrolyte.

* * * * *